United States Patent
Makarov

(10) Patent No.: US 11,958,324 B2
(45) Date of Patent: Apr. 16, 2024

(54) MULTIFUNCTIONAL ALL-TERRAIN VEHICLE

(71) Applicant: Kseniya Maksimovna Belonogova, Tyumen Tyumenskaya obl. (RU)

(72) Inventor: Mikhail Alekseevich Makarov, Ekaterinburg (RU)

(73) Assignee: Kseniya Maksimovna Belonogova, Tyumen Tyumenskaya obl. (RU)

( * ) Notice: Subject to any disclaimer, the term of this patent is extended or adjusted under 35 U.S.C. 154(b) by 163 days.

(21) Appl. No.: 17/413,865

(22) PCT Filed: Oct. 11, 2019

(86) PCT No.: PCT/RU2019/050182
§ 371 (c)(1),
(2) Date: Jun. 14, 2021

(87) PCT Pub. No.: WO2020/122765
PCT Pub. Date: Jun. 18, 2020

(65) Prior Publication Data
US 2022/0055433 A1 Feb. 24, 2022

(30) Foreign Application Priority Data

Dec. 13, 2018 (RU) .............................. 2018144261

(51) Int. Cl.
*B60F 3/00* (2006.01)
*B62D 33/04* (2006.01)
(Continued)

(52) U.S. Cl.
CPC ............ *B60F 3/0061* (2013.01); *B62D 33/04* (2013.01); *B62D 33/0617* (2013.01); *B62D 61/10* (2013.01)

(58) Field of Classification Search
CPC .......... B60F 3/0061; B60F 3/00; B62D 33/04; B62D 21/00; B62D 23/005
See application file for complete search history.

(56) References Cited

U.S. PATENT DOCUMENTS

| | | | | |
|---|---|---|---|---|
| 2,278,255 A | * | 3/1942 | Grabbe | ..................... B60F 3/00 440/12.58 |
| 2,350,037 A | * | 5/1944 | Hofheins | ................... B60F 3/00 280/124.128 |

(Continued)

FOREIGN PATENT DOCUMENTS

| | | | |
|---|---|---|---|
| CA | 2177463 A1 | * 11/1997 | |
| CA | 2635433 A1 | * 7/2006 | ............. B60G 11/15 |

(Continued)

OTHER PUBLICATIONS

International Search Report and Written Opinion dated Nov. 28, 2019 in counterpart application No. PCT/RU2019/050192; w/English partial translation and partial machine translation (total 7 pages).

(Continued)

*Primary Examiner* — Karen Beck
(74) *Attorney, Agent, or Firm* — Seckel IP, PLLC

(57) ABSTRACT

A multifunctional all-terrain vehicle having a body for accommodating people and cargo, an engine, and a transmission having axles and wheels. Disposed on the axles are brake discs gripped within brake pads which are actuated by brake cylinders disposed in a carriage and forming a brake system, and can be used for traveling over land, water, swamps, snow. According to the invention, a single frame is configured as a three-dimensional structure, and waterproofing is additionally provided with a vertically adjustable seat.

8 Claims, 4 Drawing Sheets

(51) Int. Cl.
  *B62D 33/06*   (2006.01)
  *B62D 61/10*   (2006.01)

(56) References Cited

U.S. PATENT DOCUMENTS

| | | | |
|---|---|---|---|
| 4,735,355 A | | 4/1988 | Browning |
| 6,798,343 B2 | | 9/2004 | Carrier et al. |
| 2012/0315811 A1 | * | 12/2012 | Sancoff .................... B63G 8/36 |
| | | | 440/3 |
| 2014/0103627 A1 | * | 4/2014 | Deckard ................ B60R 22/00 |
| | | | 411/362 |
| 2017/0225728 A1 | * | 8/2017 | Nolan ....................... B60F 5/02 |
| 2019/0127931 A1 | * | 5/2019 | Nguyen .................. F02B 61/04 |

FOREIGN PATENT DOCUMENTS

| | | | | | |
|---|---|---|---|---|---|
| CN | 113183854 A | * | 7/2021 | | |
| EP | 0069621 A1 | * | 1/1983 | | |
| GB | 2473954 A | * | 3/2011 | ............ | B60F 3/0007 |
| RU | 64140 U1 | | 6/2007 | | |
| RU | 114303 U1 | | 3/2012 | | |
| RU | 2566798 C2 | | 10/2015 | | |
| RU | 170738 U1 | * | 5/2017 | | |
| RU | 2016116425 A | | 10/2017 | | |
| RU | 2680873 C2 | | 2/2019 | | |
| RU | 2694670 C1 | | 7/2019 | | |

OTHER PUBLICATIONS

CA Office Action dated Jul. 20, 2023 in counterpart application No. CA 3123389 (total 3 pages) (note: RU114303U1, D1 cited in the CA Office Action dated Jul. 20, 2023, is not listed in this IDS since it was already listed in the IDS filed Jun. 15, 2021).
CA Office Action dated Oct. 31, 2022 in counterpart application No. CA 3123389 (total 4 pages).

* cited by examiner

MULTIFUNCTIONAL ALL-TERRAIN VEHICLE

FIELD OF THE INVENTION

The invention pertains to multifunctional all-terrain vehicles having a body for accommodating people and cargo, an engine, and a transmission having axles and wheels, wherein disposed on the axles are brake discs gripped within brake pads which are actuated by brake cylinders disposed in a carriage and forming a brake system, and can be used for traveling over land, water, swamps, snow.

PRIOR ART

Currently, there are many known options for all-terrain vehicles. They all have their own areas of application. In our case, the multifunctional all-terrain vehicles considered are precisely those that can be used to transport expeditions, cargo, various technological equipment that could be used in the North for movement on land, swamps, snow, water.

Known from the prior art is a multifunctional all-terrain vehicle having a body for accommodating people and cargo, an engine, and a transmission having axles and wheels, wherein disposed on the axles are brake discs gripped within brake pads which are actuated by brake cylinders disposed in a carriage and forming a brake system, characterized in that the engine, transmission and brake system are mounted on a single frame, the lower part of which is sheathed with metal plates to form a waterproof box, wherein the brake discs gripped within the brake pads which are actuated by the brake cylinders disposed in the carriage are located inside the waterproof box, and each axle has a waterproofing means at the place of passage of the waterproof box, to increase reliability (see RU 114303 U1, class B62D33/00, publ. Mar. 20, 2012, p. 6-7 descriptions, FIG. 1-3, total 9 p.).

This prior art is the closest in technical essence and the achieved technical result and is selected for the prototype of the proposed invention.

The disadvantage of this prototype is the absence of a possibility for adjustment of the axle height, which is important when replacing the gasket or drive shaft, as well as the absence of a possibility for convenient centering of the axles.

DISCLOSURE OF THE INVENTION

Based on this original observation, the present invention mainly aims to provide a multifunctional all-terrain vehicle that allows at least to offset as a minimum one of the above disadvantages, namely, to increase the reliability of the all-terrain vehicle structure by protecting the elements of the brake system against water, as well as providing the possibility for adjusting the axle height and centering the axle.

To achieve this goal, a single frame is configured as a three-dimensional structure, and a waterproofing means is additionally provided with a vertically adjustable seat.

Thanks to these advantageous characteristics, it becomes possible to provide waterproofing of the elements of the brake system. That is, due to the fact that the brake discs gripped within the brake pads which are actuated by the brake cylinders disposed in the carriage are located inside the waterproof box and each axle has a waterproofing means at the place of passage of the waterproof box, water does not get inside the waterproof box, and the elements of the brake system are not exposed to water, do not rust, and last longer.

Also, thanks to these advantageous characteristics, it becomes possible to adjust the axle height, which is important when replacing the gasket or drive shaft, as well as it becomes possible to conveniently center the axles.

There is a possible embodiment of the invention, in which the waterproofing means is made in the form of a rubber reinforced double seal.

Thanks to this advantageous characteristic, it becomes possible to make a specific version of the waterproofing means, which provides a reliable and tight connection, in which the axis can pass through the waterproof box and rotate in it.

The set of essential features of the proposed invention is unknown from the prior art for methods of a similar purpose, which allows us to conclude that the criterion of "novelty" for the invention in relation to the method has been met.

BRIEF DESCRIPTION OF DRAWINGS

Other distinctive features and advantages of the present invention clearly follow from the description given below by way of illustration and not being limiting, with reference to the accompanying drawings, in which.

Figure 1:
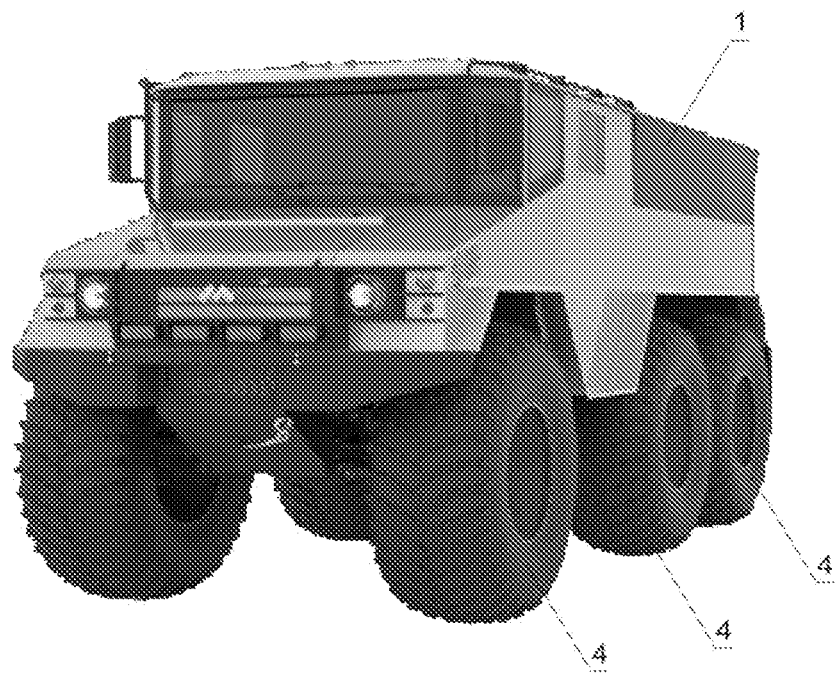
FIG. 1 shows the general appearance of the front and side of the multifunctional all-terrain vehicle, according to the prior art.
Figure 2:
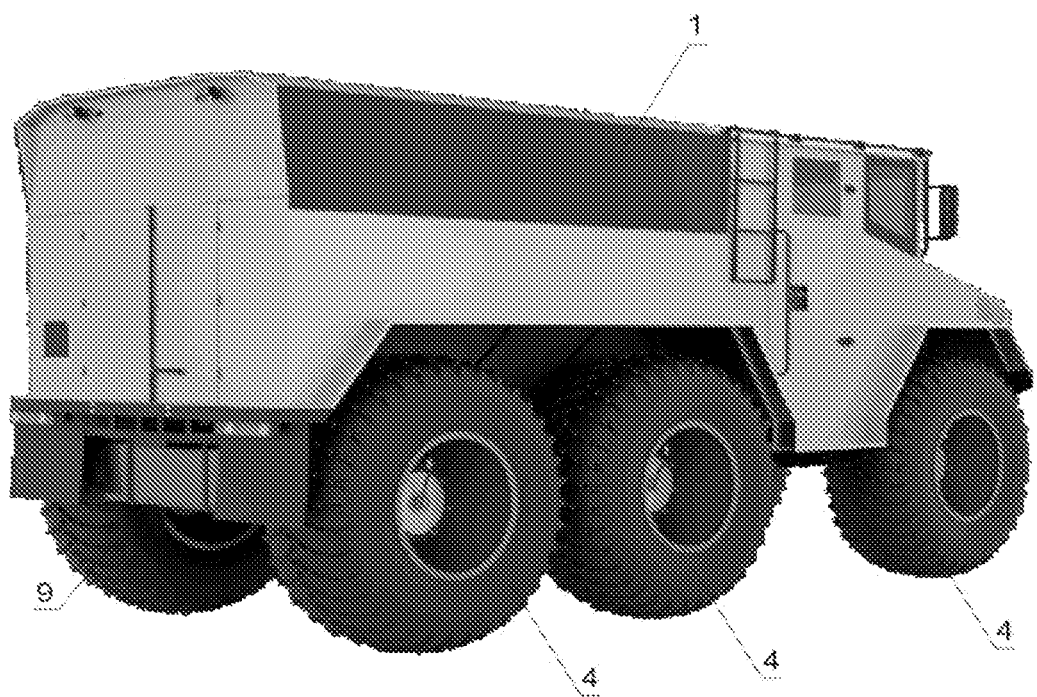
FIG. 2 shows the general appearance of the back and side of the multifunctional all-terrain vehicle, according to the prior art, FIG. 3 schematically shows a partial bottom view according to the invention, FIG. 4 schematically shows an isometric diagram of the brake system according to the invention, FIG. 5 schematically shows a sectional isometric view of the brake system according to the invention, According to FIGS. 1-5, the multifunctional all-terrain vehicle has a body 1 for accommodating people and cargo, an engine 2, a transmission 21 with axles 3, and wheels 4. On the axles 3 are disposed brake discs 5, gripped within brake pads 6, actuated by the brake cylinders 7 disposed in a carriage 8, forming a brake system.
Figure 3:
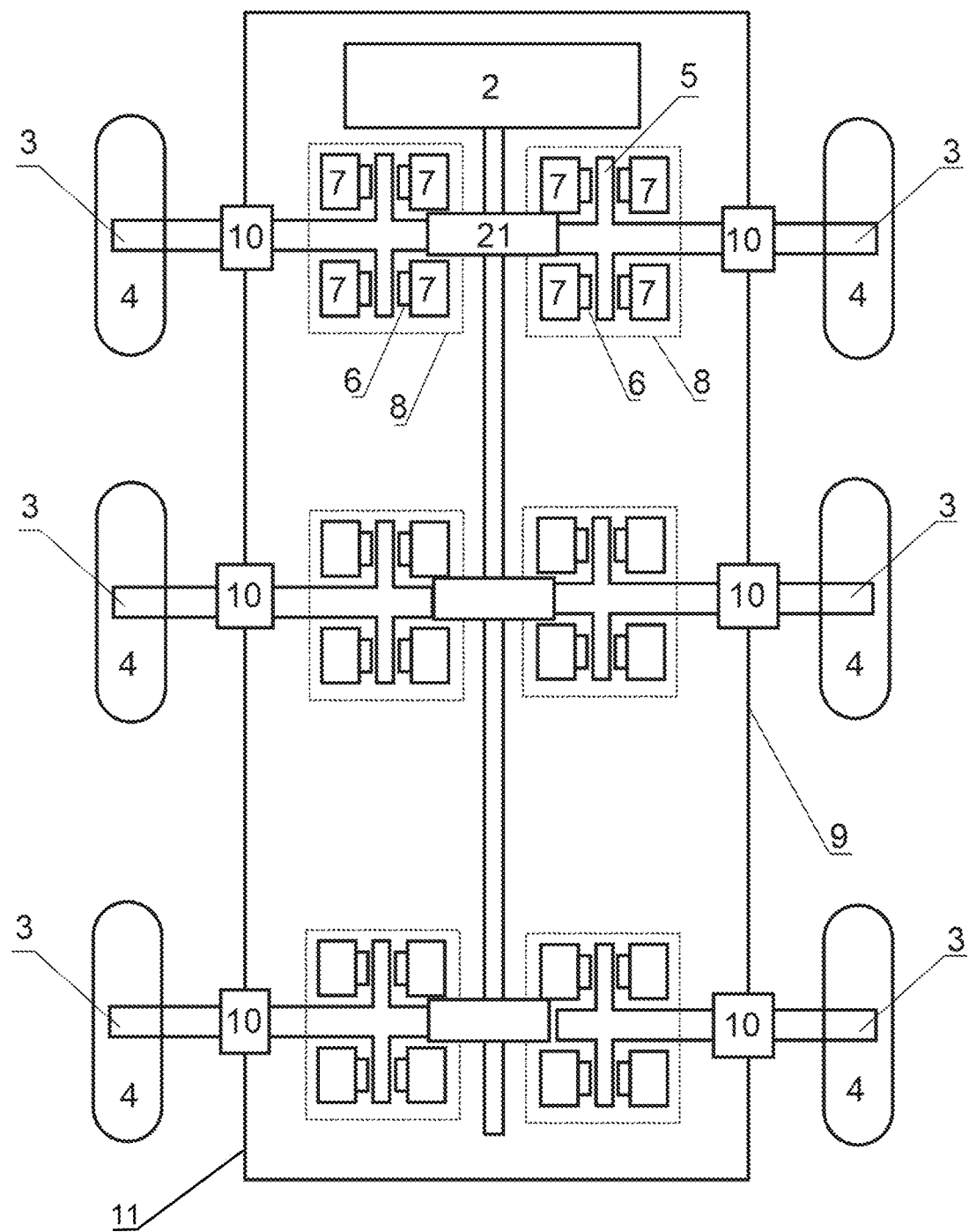
Figure 4:
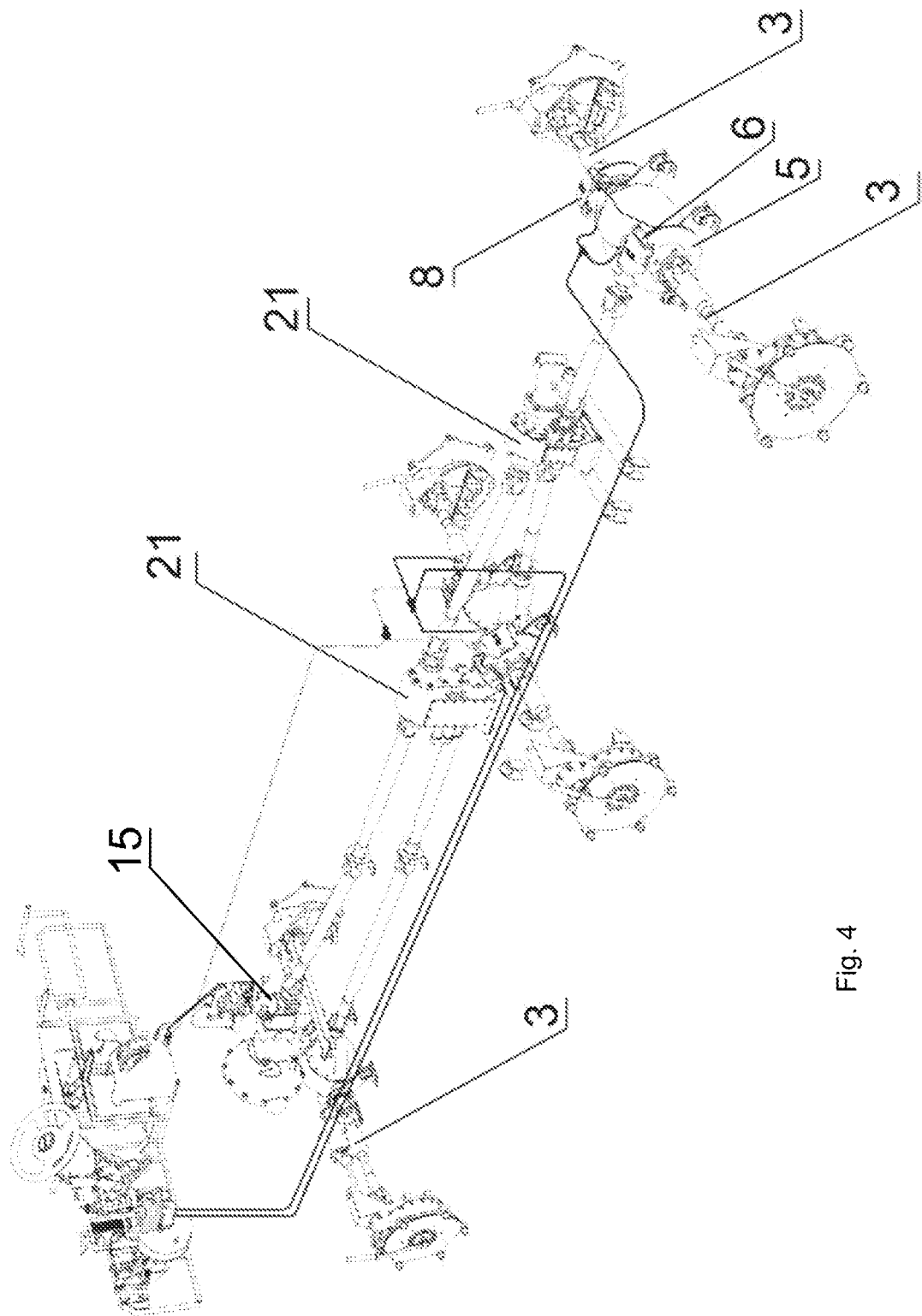
Figure 5:
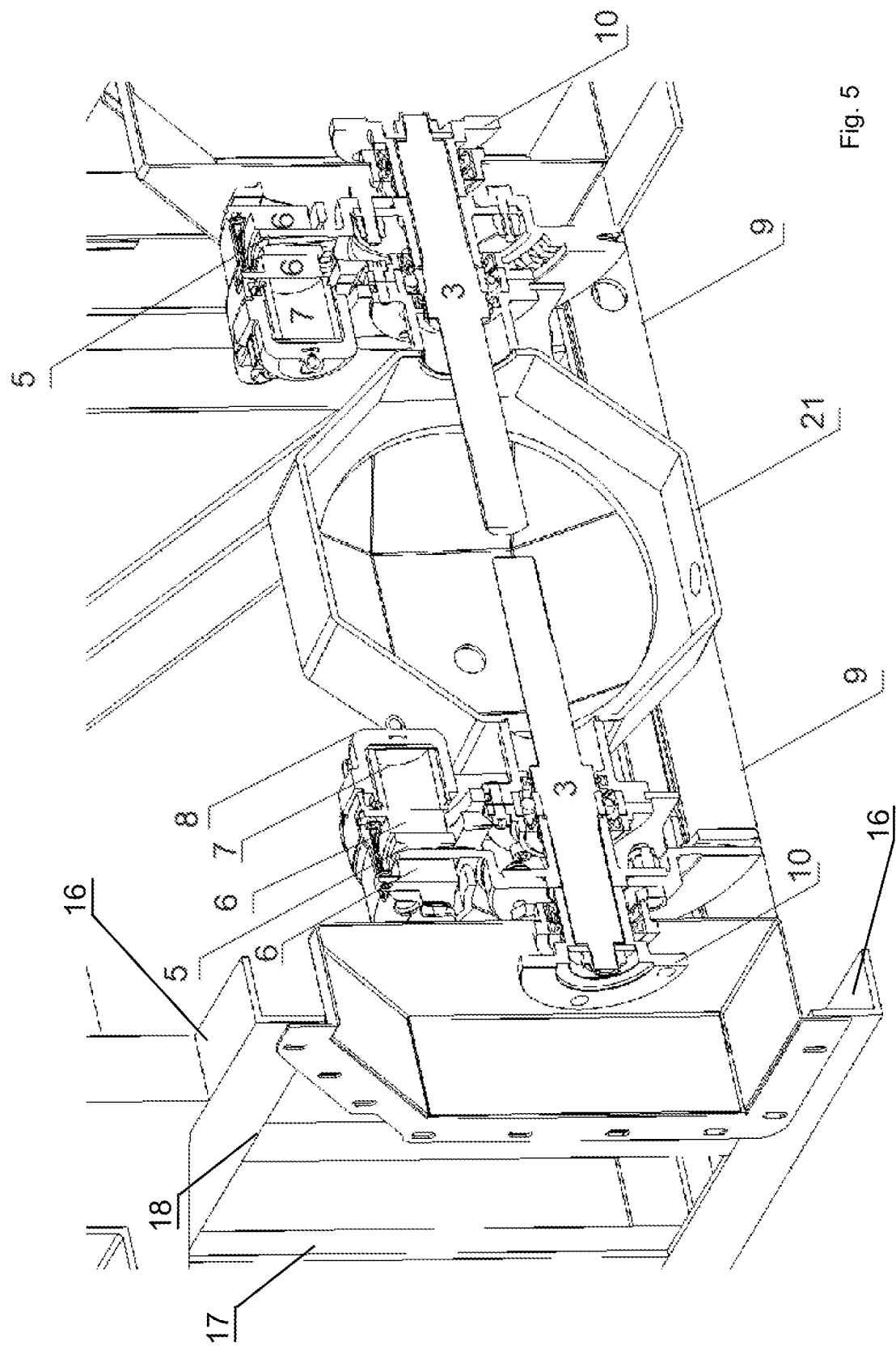

The engine 2, transmission and brake system are mounted on a single frame 11, forming a volumetric structure, the lower part of which is sheathed with metal plates to form a waterproof box 9, wherein the brake discs 5 gripped within the brake pads 6, which are actuated by the brake cylinders 7, disposed in the carriage 8 are located inside the waterproof box, and each axis 3 has a waterproofing means 10 at the place of passage of the waterproof box 91.

The waterproofing means 10 is preferably made in the form of a rubber reinforced double seal.

Preferably, the waterproofing means 10 is additionally provided with a vertically adjustable seat.

Preferably aluminum plates are used as metal plates, since aluminum is a light metal and does not corrode, which is very important in conditions of temperature difference. The less moisture the less rust.

IMPLEMENTATION OF THE INVENTION

The multifunctional all-terrain vehicle is used to travel on land, swamps, snow or water in a standard way; the implementation does not include unusual activities.

INDUSTRIAL APPLICABILITY

The multifunctional all-terrain vehicle can be implemented by a specialist in practice and, when implemented, ensures the realization of the claimed purpose. The possibility of implementation in practice follows from the fact that for each feature included in the claims based on the description there is a known material equivalent, which allows us to conclude that the criterion of "industrial applicability" for the invention and the criterion of "completeness of disclosure" for the invention have been met.

In accordance with the proposed solution, the applicants have manufactured an experimental model of the multifunctional all-terrain vehicle.

The lower part of the single frame was made of a 50×50×5 mm steel corner 16, and the upper part of the single frame was made of a 20×20×1.5 mm pipe 17 with a lateral stiffness armature made of a 40×40×2 mm pipe 18. The weight of the frame and lateral stiffness armature is 450 kg.

The frame took on all the main loads during cross axling and driving on rough terrain.

The fact that the engine 2, transmission and brake system were mounted on a single frame, forming a three-dimensional structure, the lower part of which is sheathed with metal plates to form a waterproof box 9, and brake discs 5 gripped within brake pads 6, which are actuated by brake cylinders 7, disposed in a carriage 8, were located inside the waterproof box, and each axis 3 has a waterproofing means 10 at the place of passage of the waterproof box 91, ultimately ensured the implementation of the achieved technical result—increasing the reliability of the structure of the all-terrain vehicle by protecting the elements of the brake system against water. In addition, the advantage of this solution is a greater service life of the brake system. Indeed, if the brakes are located outside, dirt gets into them, and even without braking they grind and wear out, since the dirt works as an abrasive, and this means a shorter service life of the elements of the brake system.

In addition, as a result of the tests of the experimental model of the multifunctional all-terrain vehicle, it was found that, in comparison with analogues, it:

1. Has a clearance higher than all others (700 mm, rather than 600);
2. Can carry more weight and volume of cargo (2.5 metric tons, rather than 1,5);
3. Is able to take on board 16 people (rather than 10 as usual);
4. Is able to accelerate to 80 km/h (rather than 60 km/h as usual);
5. Is fueled with 360 liters of fuel (rather than 250 liters as usual). The main tank is 80 liters and there are two additional tanks of 140 liters each. Plus, it is possible to optionally install two additional tanks of 150 liters each in the inter-axle (inter-wheel) space (between 2 and 3 axles) on both sides of the all-terrain vehicle.

All components are in a waterproof box, and they are warmed by the heat of the engine.

In addition, an additional achieved technical result of this technical solution is its exceptional environmental friendliness. This is not only due to the fact that the proposed multifunctional all-terrain vehicle will be used on low and ultra-low pressure tires and this wheeled running gear does not destroy the soil-sod layer, and is as gentle as possible on surfaces/soils. In this case, since the engine, transmission, gearbox 15, and brakes are located inside the body of the all-terrain vehicle, therefore, none of the technical fluids responsible for the functioning and performance of these components/assemblies can get out in any way in the event of a breakdown or accident, and thereby harm the environment and ecosystem. In other words, if suddenly there is a fuel leak from the fuel line, damage to the brake system or clutch circuit, a crack in the housing of the inter-axle gear system/axle bridge, damage to the radiator/cooling system, overheating/overpressure in the engine, etc.—the engine oil, brake fluid, antifreeze, transmission oil—all of this will remain inside the sealed lower body of the all-terrain vehicle and will not get out.

Finally, an additional achieved technical result of this technical solution is the increased buoyancy of the multifunctional all-terrain vehicle. Usually, the buoyancy of a multifunctional all-terrain vehicle is provided by the wheels. However, if they are damaged, buoyancy will be ensured precisely due to the waterproof box, which will make it possible to wait for help. In other words, the proposed multifunctional all-terrain vehicle will keep afloat in the event of damage to one, perhaps even two wheels out of six due to only one waterproof box.

The invention claimed is:

1. A multifunctional all-terrain vehicle, comprising:
   a body for accommodating people and cargo,
   an engine,
   a transmission having axles and wheels, and
   a brake system comprising brake discs disposed in a carriage, brake pads and brake cylinders, the brake discs being disposed on the axles, the brake discs being gripped within the brake pads which are actuated by the brake cylinders,
   wherein the engine, the transmission and the brake system are mounted on a single frame,
   wherein a lower part of the frame is sheathed with metal plates to form a waterproof box,
   wherein the brake discs gripped within the brake pads which are actuated by the brake cylinders disposed in the carriage are located inside the waterproofed box,
   wherein each of the axles has waterproofing at the place of passage of the waterproof box,
   wherein the single frame is configured as a three-dimensional structure,
   wherein the waterproof box is adapted to ensure a buoyancy of the multifunctional all-terrain vehicle,
   wherein a lower part of the single frame is made of steel corner,
   wherein an upper part of the single frame comprises first pipes having first cross-sectional dimensions and second pipes having second cross-sectional dimensions different from the first cross-sectional dimensions of the first pipes, wherein the second pipes form a lateral stiffness armature of the single frame,
   wherein the lower part of the single frame is made of 50×50×5 mm steel corner,
   wherein, in the upper part of the single frame, the first pipe is a 20×20×1 5 mm pipe, and in the lateral stiffness armature, the second pipe is a 40×40×2 mm pipe, and
   wherein a weight of the single frame and the lateral stiffness armature is 450 kg.

2. The multifunctional all-terrain vehicle according to claim 1, wherein the waterproofing is in the form of a rubber reinforced double seal.

3. The multifunctional all-terrain vehicle according to claim 1, wherein the metal plates are made from aluminum.

4. The multifunctional all-terrain vehicle according to claim 1, which is adapted to be used on low and ultra-low pressure tires.

5. The multifunctional all-terrain vehicle according to claim 1, wherein a clearance of the multifunctional all-terrain vehicle is 700 mm.

6. The multifunctional all-terrain vehicle according to claim 1, wherein a volume of cargo of the multifunctional all-terrain vehicle is 2.5 metric tons.

7. The multifunctional all-terrain vehicle according to claim 1, wherein the multifunctional all-terrain vehicle is adapted to take on board 16 people.

8. The multifunctional all-terrain vehicle according to claim 1, wherein the multifunctional all-terrain vehicle is adapted to accelerate to 80 km/h.

* * * * *